US008074102B2

(12) United States Patent
Zhang

(10) Patent No.: US 8,074,102 B2
(45) Date of Patent: Dec. 6, 2011

(54) METHOD FOR REACTIVATING AT LEAST ONE MEDIA TRANSFER PROTOCOL-COMPATIBLE DEVICE WHEN AN UNRECOVERABLE ERROR OCCURS, AND ASSOCIATED HOST

(75) Inventor: Jian Zhang, Hefei (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 22 days.

(21) Appl. No.: 12/545,064

(22) Filed: Aug. 20, 2009

(65) Prior Publication Data

US 2011/0010577 A1    Jan. 13, 2011

(30) Foreign Application Priority Data

Jul. 13, 2009   (CN) .......................... 2009 1 0157547

(51) Int. Cl.
*G06F 11/00*   (2006.01)
(52) U.S. Cl. ...................... 714/5.11; 719/322
(58) Field of Classification Search .................. 719/322
See application file for complete search history.

(56) References Cited

U.S. PATENT DOCUMENTS

| | | | | |
|---|---|---|---|---|
| 7,505,404 B2* | 3/2009 | Sturrock et al. | ............. | 370/228 |
| 7,536,486 B2* | 5/2009 | Sadovsky et al. | ............. | 710/11 |
| 7,570,658 B2* | 8/2009 | Sturrock et al. | ............. | 370/465 |
| 7,689,677 B2* | 3/2010 | Hickey et al. | ............. | 709/220 |
| 2006/0026269 A1* | 2/2006 | Sadovsky et al. | ............. | 709/222 |
| 2006/0041675 A1* | 2/2006 | Sturrock et al. | ............. | 709/231 |
| 2006/0041677 A1* | 2/2006 | Sturrock et al. | ............. | 709/232 |
| 2006/0203987 A1* | 9/2006 | Angermayr et al. | ............. | 379/230 |
| 2007/0250649 A1* | 10/2007 | Hickey et al. | ............. | 710/62 |
| 2008/0168243 A1* | 7/2008 | Bychkov et al. | ............. | 711/161 |
| 2008/0189349 A1* | 8/2008 | Krig | ............. | 709/200 |
| 2009/0024757 A1* | 1/2009 | Proctor | ............. | 709/232 |
| 2009/0207262 A1* | 8/2009 | Kurosawa | ............. | 348/211.99 |
| 2009/0222809 A1* | 9/2009 | Krig | ............. | 717/171 |

* cited by examiner

*Primary Examiner* — Christopher McCarthy
(74) *Attorney, Agent, or Firm* — Winston Hsu; Scott Margo

(57) ABSTRACT

A method for reactivating at least one media transfer protocol-compatible (MTP-compatible) device when an unrecoverable error occurs includes: temporarily storing a transaction ID of a latest operation performed on the MTP-compatible device; and selectively communicating with the MTP-compatible device by utilizing the transaction ID when an unrecoverable error of the MTP-compatible device occurs. An associated host for reactivating at least one MTP-compatible device when an unrecoverable error occurs includes a storage unit and a processing circuit. The storage unit is arranged to temporarily store a transaction ID of a latest operation performed on the MTP-compatible device. In addition, the processing circuit is arranged to selectively communicate with the MTP-compatible device by utilizing the transaction ID when an unrecoverable error of the MTP-compatible device occurs.

16 Claims, 4 Drawing Sheets

METHOD FOR REACTIVATING AT LEAST ONE MEDIA TRANSFER PROTOCOL-COMPATIBLE DEVICE WHEN AN UNRECOVERABLE ERROR OCCURS, AND ASSOCIATED HOST

BACKGROUND

The present invention relates to a media transfer protocol (MTP) of Microsoft Corporation, and more particularly, to a method for reactivating at least one MTP-compatible device when an unrecoverable error occurs, and an associated host.

As announced by Microsoft Corporation, an MTP is a protocol for intelligent storage devices, based on a Picture Transfer Protocol (PTP), which is well-known and is compatible with the PTP.

According to public information regarding MTP implementation details released by Microsoft Corporation on the Internet, the MTP enables: metadata-based enumeration; object transfer; command and control; and eventing. In addition, the MTP is optimized for: very large storages; multifunction devices; and high-power initiators and low-power responders. Additionally, the MTP is a key part of WMDRM10-PD and PlaysForSure. Regarding WMDRM10-PD and PlaysForSure, please refer to specifications released by Microsoft Corporation for related information.

For the readers' convenience, some MTP fundamentals cited by the public information are further listed below. The MTP is a binary protocol, which utilizes an initiator-responder model. For example, an initiator initiates and a responder must respond, where the initiator builds a model of responder contents. In addition, the MTP is transport-independent. For example, it can be implemented over USB or IP. In addition, the MTP is multi-session aware, where a device UI is a session. Additionally, the MTP is extensible.

As cited by the public information mentioned above, device contents are exposed as objects, where they are identified by session-based 32-bit object handles. In addition, a device is described by device properties, where descriptions and control are provided. In addition, objects are described by object properties, where descriptions and constraints are provided. Additionally, there are device-initiated events, where multi-session support is provided. Please refer to MTP specifications released by Microsoft Corporation for more details.

According to the related art, most conventional devices complying with MTP specifications can support only a single session ID. Thus, a conventional host can open only one session for each conventional device from the moment when the conventional device is connected to the conventional host until the moment when the conventional device is disconnected from the conventional host.

In a worst situation, when an unrecoverable error occurs, the conventional host cannot reactivate the conventional device by simply sending a hardware reset signal to the conventional device since an opened session already exists and there is no more session ID available. As a result, according to the related art, disconnecting the conventional device from the conventional host and then reconnecting the conventional device to the conventional host is the only solution to the problem, causing great inconvenience to end users.

SUMMARY

It is therefore an objective of the claimed invention to provide a method for reactivating at least one media transfer protocol-compatible (MTP-compatible) device when an unrecoverable error occurs, and an associated host, in order to solve the above-mentioned problem.

An exemplary embodiment of a method for reactivating at least one MTP-compatible device when an unrecoverable error occurs comprises: temporarily storing a transaction ID of a latest operation performed on the MTP-compatible device; and selectively communicating with the MTP-compatible device by utilizing the transaction ID when an unrecoverable error of the MTP-compatible device occurs.

An exemplary embodiment of a host for reactivating at least one MTP-compatible device when an unrecoverable error occurs comprises a storage unit and a processing circuit. The storage unit is arranged to temporarily store a transaction ID of a latest operation performed on the MTP-compatible device. In addition, the processing circuit is arranged to selectively communicate with the MTP-compatible device by utilizing the transaction ID when an unrecoverable error of the MTP-compatible device occurs.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
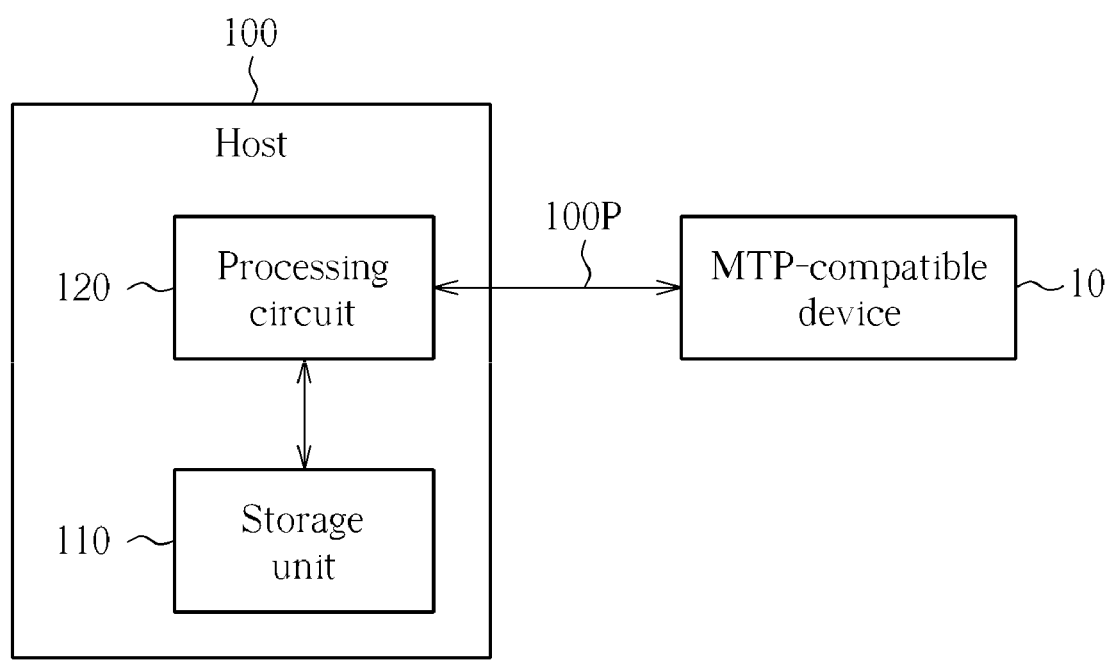
FIG. 1 is a diagram of a host for reactivating at least one media transfer protocol-compatible (MTP-compatible) device when an unrecoverable error occurs according to an embodiment of the present invention.

Please refer to FIG. 1. FIG. 1 is a diagram of a host 100 for reactivating at least one media transfer protocol-compatible (MTP-compatible) device 10 when an unrecoverable error occurs according to an embodiment of the present invention. In this embodiment, the MTP-compatible device 10 can be connected to the host 100 through a communication port 100P of the host 100, such as a Universal Serial Bus (USB) port. This is for illustrative purposes only, and is not meant to be a limitation of the present invention. According to a variation of this embodiment, the communication port 100P can be another port suggested in MTP specifications.

As shown in FIG. 1, the host 100 comprises a storage unit 110 and a processing circuit 120. In this embodiment, the storage unit 110 can be a register. This is for illustrative purposes only, and is not meant to be a limitation of the present invention. According to a variation of this embodiment, the storage unit 110 can be a memory such as a random access memory (RAM).

In this embodiment, the processing circuit 120 can be implemented as a controller executing a program code such as a hardware code. This is for illustrative purposes only, and is not meant to be a limitation of the present invention. According to a variation of this embodiment, the processing circuit 120 can be implemented as a micro-processing unit (MCU) executing a program code such as a firmware code read from a non-volatile (NV) memory. According to another variation of this embodiment, the processing circuit 120 can be implemented as a central processing unit (CPU) executing a program code such as a software code.

According to an embodiment, the storage unit 110 is arranged to temporarily store a transaction ID of a latest operation performed on the MTP-compatible device 10. In addition, the processing circuit 120 is arranged to selectively communicate with the MTP-compatible device 10 by utilizing the transaction ID when an unrecoverable error of the MTP-compatible device 10 occurs.

Please note that, according to the related art, when an unrecoverable error occurs, the conventional host cannot reactivate the conventional device by simply sending a hardware reset signal to the conventional device since an opened session already exists and there is no more session ID available.

According to this embodiment, however, the processing circuit 120 of the host 100 is capable of selectively communicating with the MTP-compatible device 10 by utilizing the transaction ID when an unrecoverable error of the MTP-compatible device 10 occurs, in order to resolve the deadlock due to strict regulations of MTP specifications and the situation where there is no more session ID available. Thus, disconnecting the MTP-compatible device 10 from the host 100 and then reconnecting the MTP-compatible device 10 to the host 100 is not required. The present invention therefore provides end users with a more comfortable experience when using the MTP-compatible device 10 together with the host 100.

Figure 2:
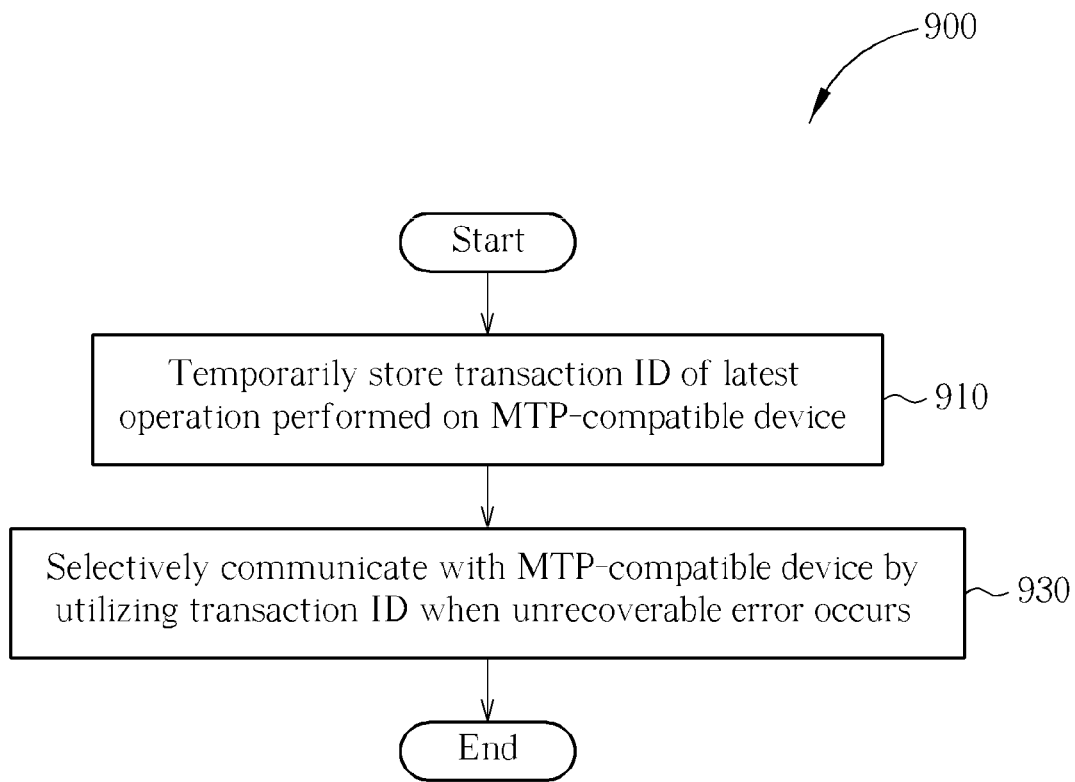
FIG. 2 is a flowchart of a method for reactivating at least one MTP-compatible device when an unrecoverable error occurs according to various embodiments of the present invention.

Detailed operations of the host 100 are further described by referring to FIG. 2. FIG. 2 is a flowchart of a method 900 for reactivating at least one MTP-compatible device when an unrecoverable error occurs according to various embodiments of the present invention. The method 900 can be applied to the host 100 mentioned above, and can be implemented by utilizing the host 100 mentioned above. The method 900 is described as follows.

In Step 910, the storage unit 110 temporarily stores a transaction ID of a latest operation performed on the MTP-compatible device 10. According to this embodiment, whenever the processing circuit 120 performs a specific operation on the MTP-compatible device 10, the processing circuit 120 sends the transaction ID of the specific operation to the storage unit 110. As a result, the storage unit 110 always keeps the transaction ID of the latest operation performed on the MTP-compatible device 10.

In Step 930, the processing circuit 120 selectively communicates with the MTP-compatible device 10 by utilizing the transaction ID (i.e. the transaction ID of the latest operation performed on the MTP-compatible device 10) when an unrecoverable error of the MTP-compatible device 10 occurs. For example, when an unrecoverable error of the MTP-compatible device 10 occurs, the processing circuit 120 selectively closes the opened session by utilizing the transaction ID and then opens a new session for the MTP-compatible device 10. In another example, the processing circuit 120 selectively performs a next operation on the MTP-compatible device 10 by utilizing the transaction ID when an unrecoverable error of the MTP-compatible device 10 occurs, where the next operation mentioned above can be an operation that has been scheduled to be performed after the latest operation performed on the MTP-compatible device 10.

Figure 3:
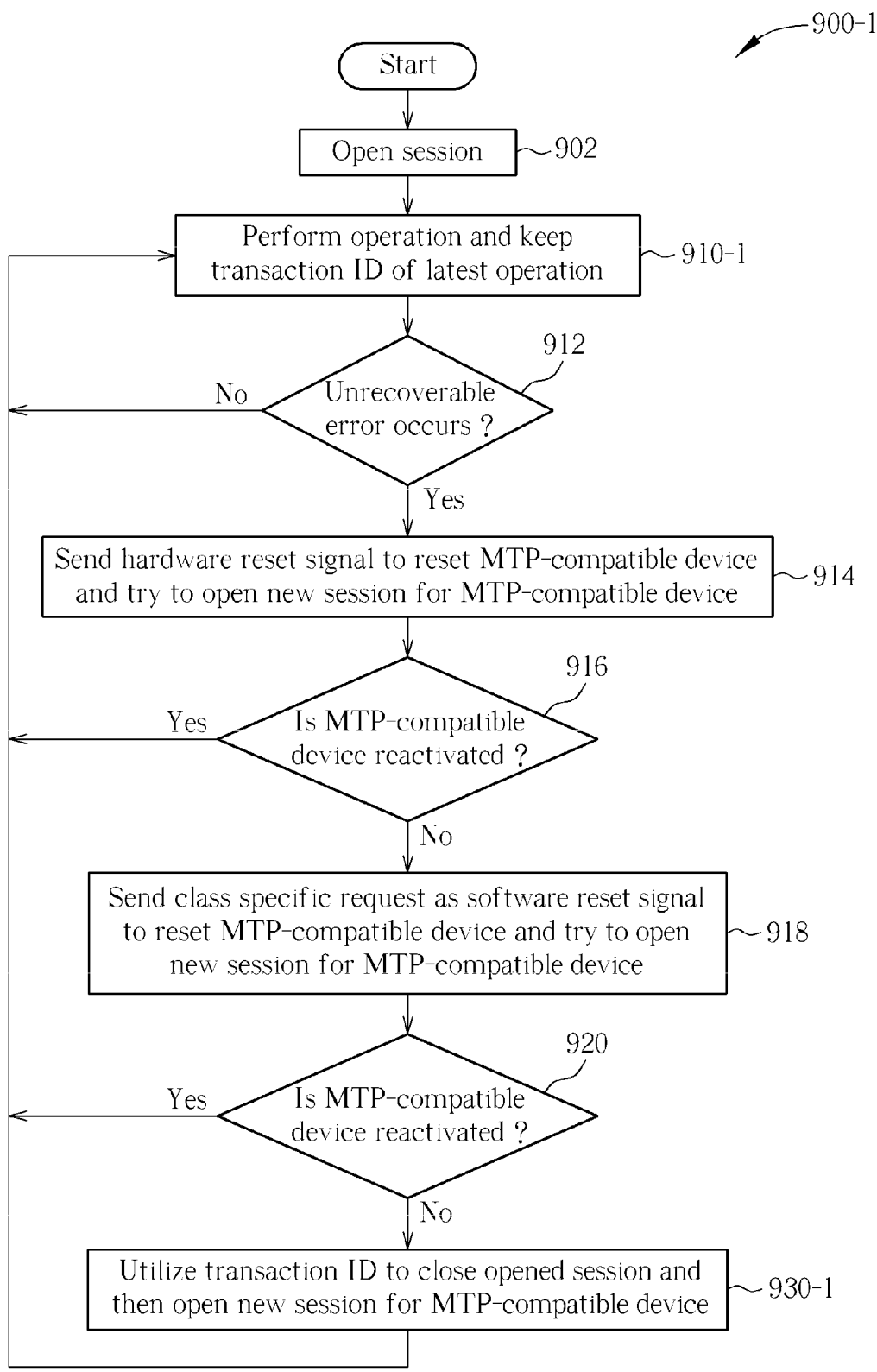
FIG. 3 illustrates implementation details of the method shown in FIG. 2 according to a first embodiment of the present invention.

FIG. 3 illustrates a detailed workflow 900-1 of the method 900 shown in FIG. 2 according to a first embodiment of the present invention, where Step 910-1 of this embodiment corresponds to Step 910 mentioned above, and Step 930-1 of this embodiment corresponds to Step 930 mentioned above.

In Step 902, the processing circuit 120 opens a session. More particularly, the processing circuit 120 opens the session for the MTP-compatible device 10 when the MTP-compatible device 10 is connected to the host 100 by a user.

In Step 910-1, the processing circuit 120 performs at least one operation and keeps the transaction ID of the latest operation. For example, the processing circuit 120 performs an operation on the MTP-compatible device 10 by sending a command to the MTP-compatible device 10, and keeps the transaction ID of the latest operation by temporarily storing the transaction ID into the storage unit 110.

In Step 912, the processing circuit 120 checks whether an unrecoverable error occurs. According to this embodiment, when an unrecoverable error of the MTP-compatible device 10 occurs, Step 914 is entered; otherwise, Step 910-1 is re-entered.

In Step 914, the processing circuit 120 sends a hardware reset signal to reset the MTP-compatible device 10 and tries to open a new session for the MTP-compatible device 10.

In Step 916, the processing circuit 120 checks whether the MTP-compatible device 10 is reactivated. When the MTP-compatible device 10 is reactivated by the hardware reset signal, Step 910-1 is re-entered; otherwise (i.e. the MTP-compatible device 10 is not reactivated by the hardware reset signal), Step 918 is entered.

In Step 918, the processing circuit 120 sends a class specific request as a software reset signal to reset the MTP-compatible device and tries to open a new session for the MTP-compatible device, where the class specific request of this embodiment can be defined by a still image class driver.

In Step 920, the processing circuit 120 checks whether the MTP-compatible device 10 is reactivated. When the MTP-compatible device 10 is reactivated by the software reset signal, Step 910-1 is re-entered; otherwise (i.e. the MTP-compatible device 10 is not reactivated by the software reset signal), Step 930-1 is entered.

In Step 930-1, the processing circuit 120 utilizes the transaction ID to close the opened session and then opens a new session for the MTP-compatible device 10. Thus, the processing circuit 120 of this embodiment communicates with the MTP-compatible device 10 by utilizing the transaction ID, in order to reactivate the MTP-compatible device 10.

In contrast to the related art, the host 100 of this embodiment keeps the transaction ID of the latest operation performed on the MTP-compatible device 10 before the unrecoverable error of the MTP-compatible device 10 occurs, and may utilize the transaction ID in Step 930-1 to prevent the deadlock mentioned above.

Please note that, in Step 912, the processing circuit 120 of this embodiment checks whether an unrecoverable error of the MTP-compatible device 10 occurs. Thus, when an unrecoverable error of the MTP-compatible device 10 occurs, Step 914 is entered; otherwise, Step 910-1 is re-entered. This is for illustrative purposes only, and is not meant to be a limitation of the present invention. According to a variation of this embodiment, in a situation where two or more MTP-compatible devices are connected to the host 100, the processing circuit 120 checks whether an unrecoverable error of any of the two or more MTP-compatible devices occurs. According to this variation, when an unrecoverable error of any of the two or more MTP-compatible devices occurs, Step 914 is entered; otherwise, Step 910-1 is re-entered. Similar descriptions are not repeated in detail for this variation here.

Figure 4:
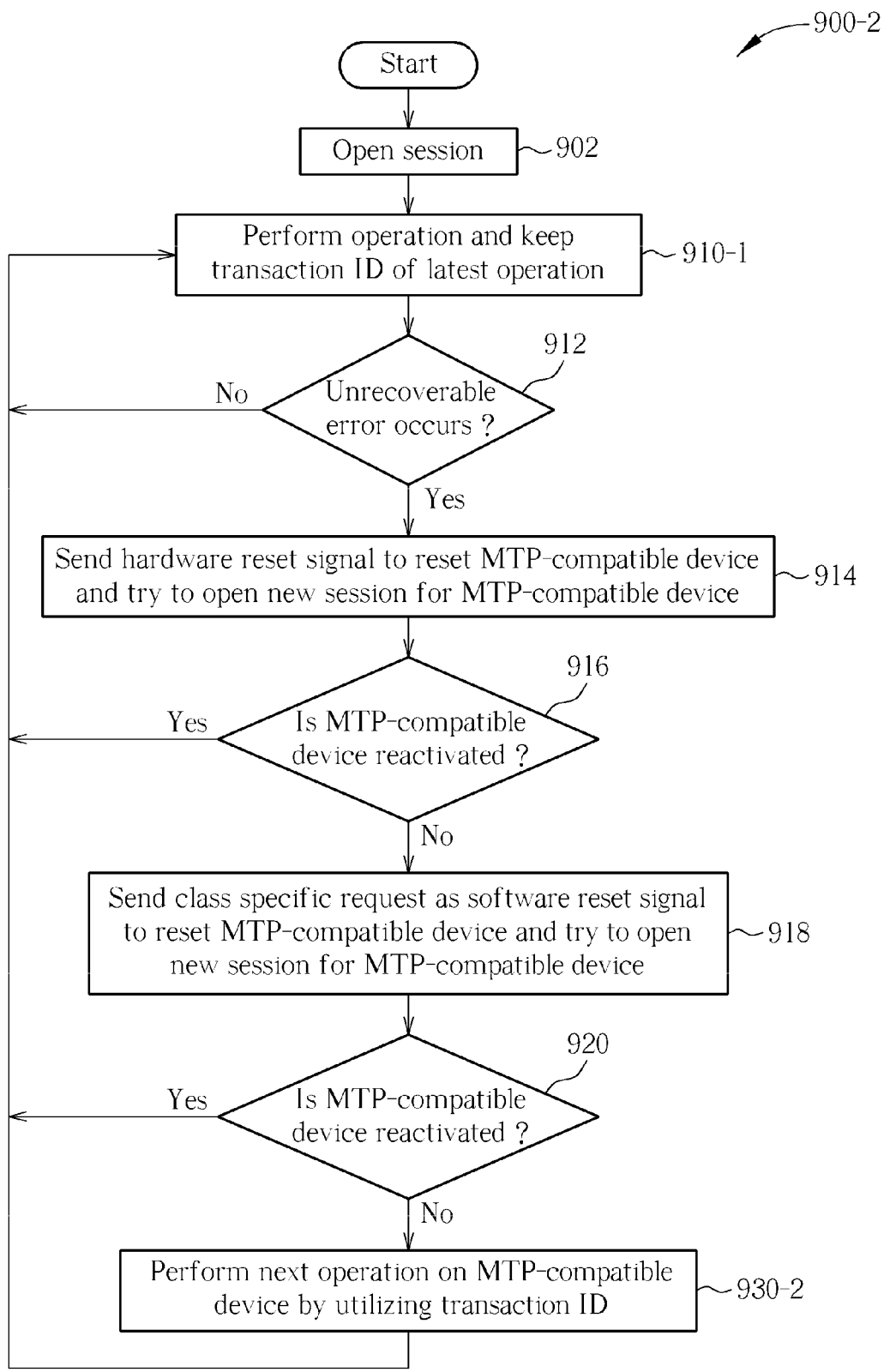
FIG. 4 illustrates implementation details of the method shown in FIG. 2 according to a second embodiment of the present invention.

FIG. 4 illustrates a detailed workflow 900-2 of the method 900 shown in FIG. 2 according to a second embodiment of the present invention, where Step 910-1 of this embodiment corresponds to Step 910 mentioned above, and Step 930-2 of this embodiment corresponds to Step 930 mentioned above. The operations of Step 902 through to Step 920 can be the same as those of the first embodiment.

In Step 920 of this embodiment, the processing circuit 120 checks whether the MTP-compatible device 10 is reactivated. When the MTP-compatible device 10 is reactivated by the software reset signal, Step 910-1 is re-entered; otherwise (i.e. the MTP-compatible device 10 is not reactivated by the software reset signal), Step 930-2 is entered.

In Step 930-2, the processing circuit 120 performs a next operation on the MTP-compatible device 10 by utilizing the transaction ID, where the next operation can be an operation that has been scheduled to be performed after the latest operation performed on the MTP-compatible device 10. Thus, the processing circuit 120 of this embodiment communicates with the MTP-compatible device 10 by utilizing the transaction ID, in order to reactivate the MTP-compatible device 10.

In contrast to the related art, the host 100 of this embodiment keeps the transaction ID of the latest operation performed on the MTP-compatible device 10 before the unrecoverable error of the MTP-compatible device 10 occurs, and may utilize the transaction ID in Step 930-1 to prevent the deadlock mentioned above. Similar descriptions for this embodiment are not repeated in detail here.

Those skilled in the art will readily observe that numerous modifications and alterations of the device and method may be made while retaining the teachings of the invention.

What is claimed is:

1. A method for reactivating at least one media transfer protocol-compatible (MTP-compatible) device when an unrecoverable error occurs, comprising:
   temporarily storing a transaction ID of a latest operation performed on the MTP-compatible device;
   selectively communicating with the MTP-compatible device by utilizing the transaction ID when an unrecoverable error of the MTP-compatible device occurs;
   when an unrecoverable error of the MTP-compatible device occurs, sending a hardware reset signal to reset the MTP-compatible device and trying to open a new session for the MTP-compatible device; and
   when the MTP-compatible device is not reactivated by the hardware reset signal, sending a class specific request as a software reset signal to reset the MTP-compatible device and trying to open a new session for the MTP-compatible device.

2. The method of claim 1, further comprising:
   when the MTP-compatible device is not reactivated by the software reset signal, communicating with the MTP-compatible device by utilizing the transaction ID.

3. The method of claim 2, further comprising:
   when the MTP-compatible device is not reactivated by the software reset signal, utilizing the transaction ID to close an opened session.

4. The method of claim 3, further comprising:
   when the MTP-compatible device is not reactivated by the software reset signal, utilizing the transaction ID to close the opened session and then opening a new session for the MTP-compatible device.

5. The method of claim 2, further comprising:
   when the MTP-compatible device is not reactivated by the software reset signal, performing a next operation on the MTP-compatible device by utilizing the transaction ID.

6. The method of claim 1, wherein the step of selectively communicating with the MTP-compatible device by utilizing the transaction ID when an unrecoverable error of the MTP-compatible device occurs further comprises:
   when an unrecoverable error of the MTP-compatible device occurs, selectively closing an opened session by utilizing the transaction ID.

7. The method of claim 6, wherein the step of selectively communicating with the MTP-compatible device by utilizing the transaction ID when an unrecoverable error of the MTP-compatible device occurs further comprises:
   when an unrecoverable error of the MTP-compatible device occurs, selectively closing the opened session by utilizing the transaction ID and then opening a new session for the MTP-compatible device.

8. The method of claim 1, wherein the step of selectively communicating with the MTP-compatible device by utilizing the transaction ID when an unrecoverable error of the MTP-compatible device occurs further comprises:
   selectively performing a next operation on the MTP-compatible device by utilizing the transaction ID when an unrecoverable error of the MTP-compatible device occurs.

9. A host for reactivating at least one media transfer protocol-compatible (MTP-compatible) device when an unrecoverable error occurs, comprising:
   a storage unit arranged to temporarily store a transaction ID of a latest operation performed on the MTP-compatible device; and
   a processing circuit arranged to selectively communicate with the MTP-compatible device by utilizing the transaction ID when an unrecoverable error of the MTP-compatible device occurs;
   wherein when an unrecoverable error of the MTP-compatible device occurs, the processing circuit sends a hardware reset signal to reset the MTP-compatible device and tries to open a new session for the MTP-compatible device; and when the MTP-compatible device is not reactivated by the hardware reset signal, the processing circuit sends a class specific request as a software reset signal to reset the MTP-compatible device and tries to open a new session for the MTP-compatible device.

10. The host of claim 9, wherein when the MTP-compatible device is not reactivated by the software reset signal, the processing circuit communicates with the MTP-compatible device by utilizing the transaction ID.

11. The host of claim 10, wherein when the MTP-compatible device is not reactivated by the software reset signal, the processing circuit utilizes the transaction ID to close an opened session.

12. The host of claim 11, wherein when the MTP-compatible device is not reactivated by the software reset signal, the processing circuit utilizes the transaction ID to close the opened session and then opens a new session for the MTP-compatible device.

13. The host of claim 10, wherein when the MTP-compatible device is not reactivated by the software reset signal, the processing circuit performs a next operation on the MTP-compatible device by utilizing the transaction ID.

14. The host of claim 9, wherein when an unrecoverable error of the MTP-compatible device occurs, the processing circuit selectively closes an opened session by utilizing the transaction ID.

15. The host of claim 14, wherein when an unrecoverable error of the MTP-compatible device occurs, the processing circuit selectively closes the opened session by utilizing the transaction ID and then opens a new session for the MTP-compatible device.

16. The host of claim 9, wherein the processing circuit selectively performs a next operation on the MTP-compatible device by utilizing the transaction ID when an unrecoverable error of the MTP-compatible device occurs.

* * * * *